(12) United States Patent
Kuan

(10) Patent No.: US 6,853,300 B2
(45) Date of Patent: Feb. 8, 2005

(54) SAW COVER SAFETY SENSING DEVICE

(76) Inventor: Kuo Lung Kuan, No. 114, Sec. 3, Ler-Her Load, Pei-Turn Area, Taichung (TW)

( * ) Notice: Subject to any disclaimer, the term of this patent is extended or adjusted under 35 U.S.C. 154(b) by 49 days.

(21) Appl. No.: 10/454,472

(22) Filed: Jun. 5, 2003

(65) Prior Publication Data

US 2004/0246132 A1 Dec. 9, 2004

(51) Int. Cl.[7] .......................... G08B 13/00; G08B 13/08; B27B 3/28; B27B 3/00; B27B 19/10; B23D 17/00; B23D 19/00
(52) U.S. Cl. .................. 340/565; 340/545.2; 340/545.4; 340/545.6; 83/62.1; 83/436.2; 83/781; 83/477.2
(58) Field of Search ........................... 340/545.2, 545.4, 340/565; 83/62.1, 436.2, 477.2, 781

(56) References Cited

U.S. PATENT DOCUMENTS 5,894,777 A * 4/1999 Sterling ..................... 83/436.2
2003/0037651 A1 * 2/2003 Gass et al. ................... 83/62.1
2004/0159198 A1 * 8/2004 Peot et al. .................... 83/62.1

* cited by examiner

*Primary Examiner*—Jeffery Hofsass
*Assistant Examiner*—Lam Pham

(57) ABSTRACT

A saw cover safety sensing device comprises a protecting cover; a sensing controller at one side of the protecting cover; a control circuit within the sensing controller; the control circuit serving for receiving electric static signals from a human body and emitting control signals; the sensing controller further comprising a power switch, at least one batteries, a plurality of LED lights and a transparent cover; at least one signal sensing wire connected to the sensing controller; each signal sensing wire having a metal foil sheet; one surface of the metal foil sheet being coated with glue so that the metal foil sheets and the signal sensing wires are adhered to the protecting cover; the signal sensing wire and metal foil sheets serving for detecting electric static signals emitted from a human body; and a buzzer connected to the sensing controller; the buzzer buzzes in response to electric static signals.

2 Claims, 5 Drawing Sheets

SAW COVER SAFETY SENSING DEVICE

FIELD OF THE INVENTION

The present invention relates to safety device, and particularly to a saw cover safety sensing device, which can emit alarm and trip the operation of a saw when electric static signals of human body is detected.

BACKGROUND OF THE INVENTION

Referring to FIG. 1, a prior art saw cover safety sensing device is illustrated. In this prior art, a machine table 1 is installed with an elevational frame 2 which is connected to a protecting cover 3. The height of elevation is in accordance with the width of the work piece. A saw is placed in the protecting cover 3. An inner front end of the protecting cover 3 is installed with an inner stop 4 for stopping undesired materials generated in sawing process. To avoid to hurt the hands of the operator, an infrared sensor 6 is installed in front of the protecting cover 3. As hands of the operator stretches into the sensing area of the infrared sensor 6, the saw will be stopped. However above mentioned prior art still has some defects which will be describe herein.

The sensing area is defined by one infrared line and thus the sensing area is too small to effectively protect the operator. On line sensing area causes that the saw must be stopped abruptly by very finite information and as a result, motor will be harmed gradually. The sensing principle is based on the hinder of the light beam, but if the light beam is hindered by human hand, the motor still stops. This will induce a trouble to users. The infrared sensor 6 is not combined to the protecting cover 3 and thus it cannot be adjusted with the protecting cover 3. Thus, it is inconvenient in operation.

SUMMARY OF THE INVENTION

Accordingly, the primary object of the present invention is to provide a saw cover safety sensing device comprising: a protecting cover; a sensing controller at a front of the protecting cover; a control circuit within the sensing controller; the control circuit serving for receiving electric static signals from a human body and emitting control signals; the sensing controller further comprising a power switch, at least one batteries, a plurality of LED lights and a transparent cover; at least one signal sensing wire connected to the sensing controller; each signal sensing wire having a metal foil sheet; one surface of the metal foil sheet being coated with glue so that the metal foil sheets and the signal sensing wires being adhered to two sides of the protecting cover; the signal sensing wires and the meta foil sheets having a function of transmitting electric static signals of human body to the sensing controller; the at least one signal sensing wire and at least one metal foil sheets having function of expanding sensing area so as to detect electric static signals emitted from a human body; and a buzzer connected to the sensing controller; the buzzer buzzes in response to electric static signals.

The various objects and advantages of the present invention will be more readily understood from the following detailed description when read in conjunction with the appended drawing.

DETAILED DESCRIPTION OF THE INVENTION

Figure 1:
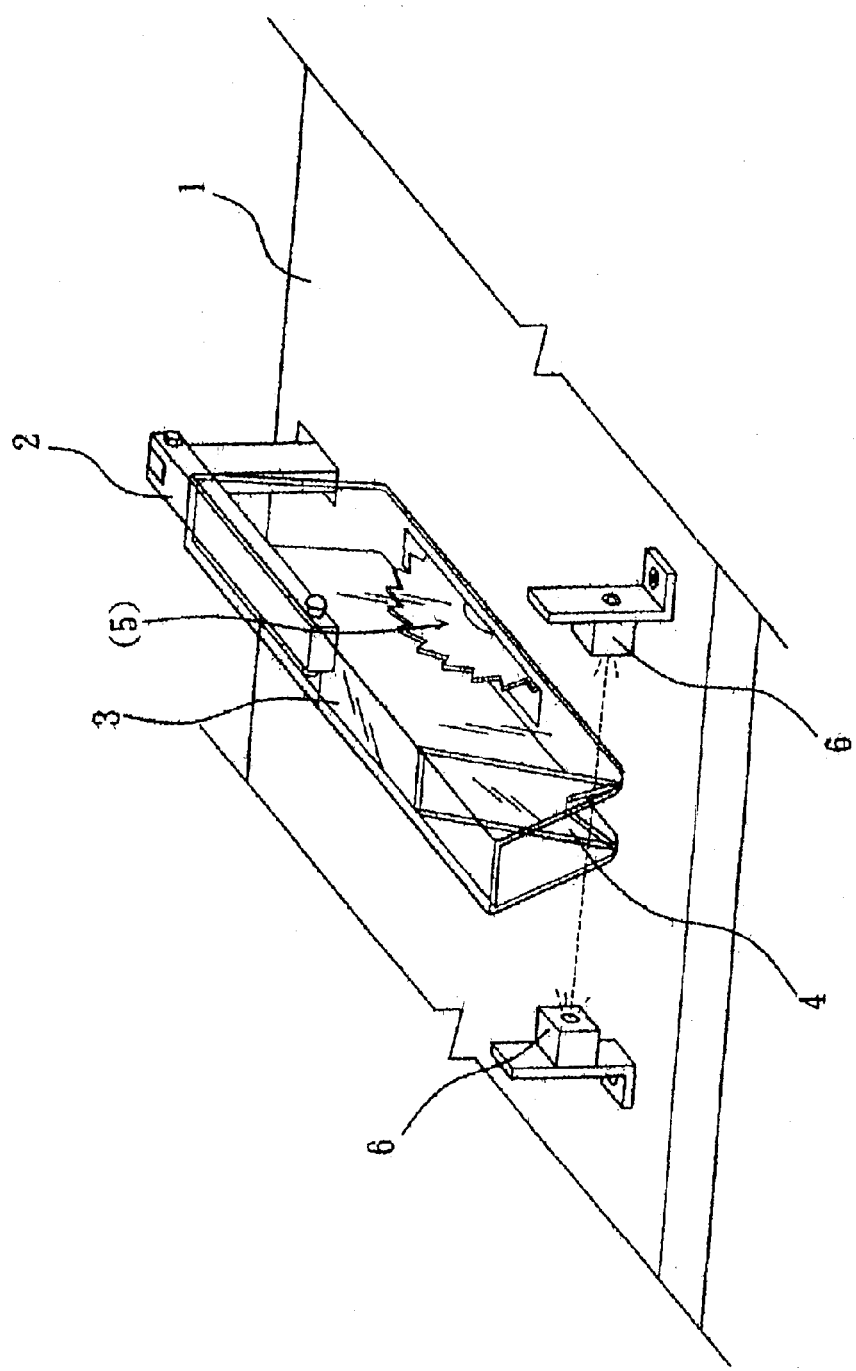
FIG. 1 is a schematic perspective view of a prior art.
Figure 2:
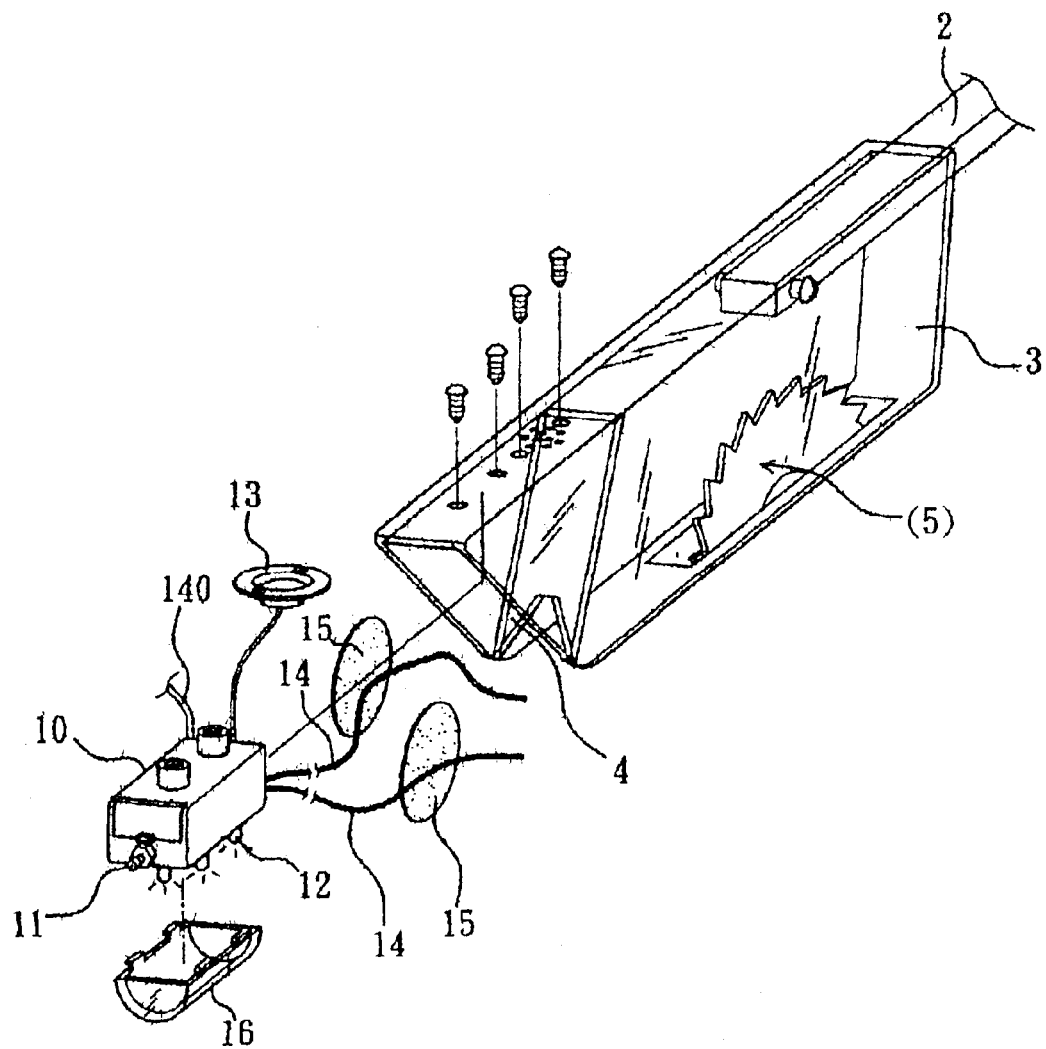
FIG. 2 is an exploded perspective view of the present invention.
Figure 3:
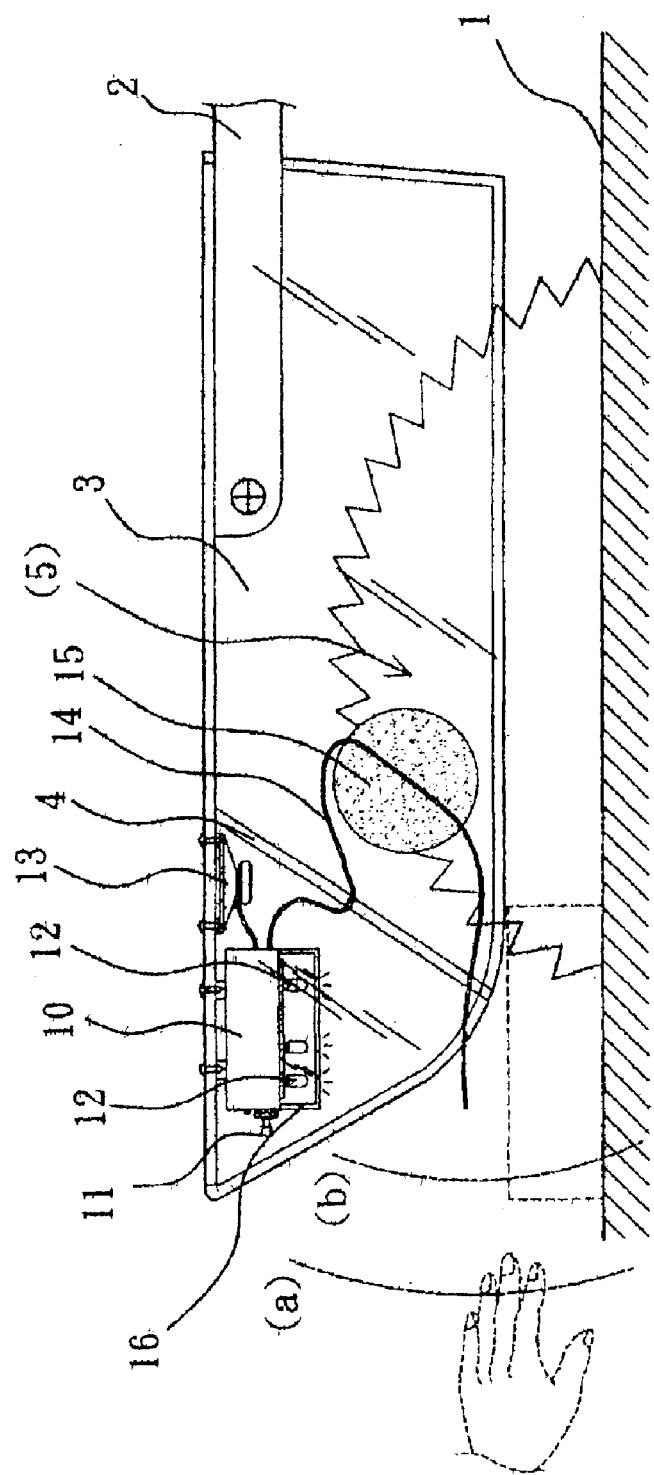
FIG. 3 is a lateral plane view of the present invention.
Figure 4:
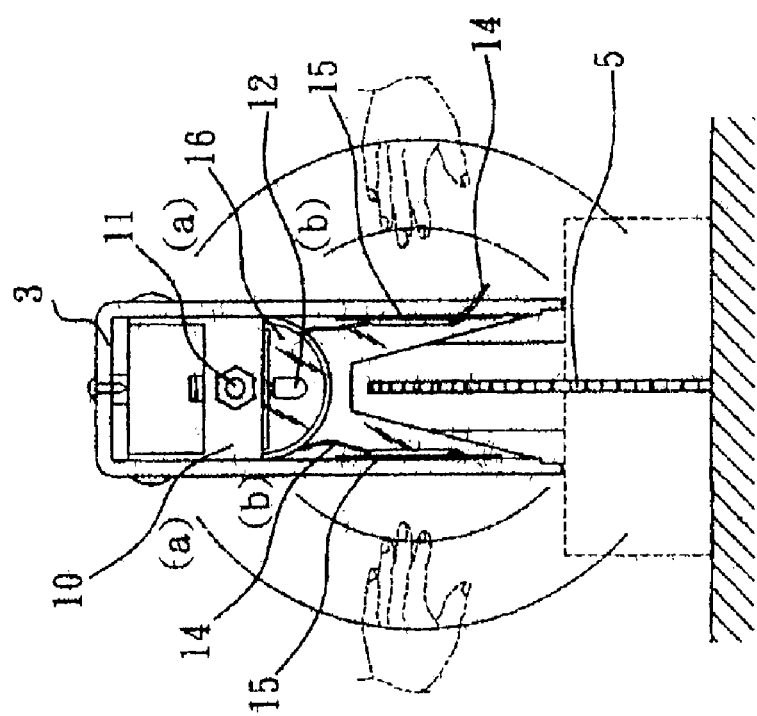
FIG. 4 is a front plane view of the present invention.

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 2, 3, 4, and 5, a transparent protecting cover 3 is illustrated. A front end of the protecting cover 3 is spaced by an inner stopper 4 so as to form a space. A sensing controller 10 is installed in the space. A control circuit board (not shown) is installed in the sensing controller 10 for receiving the electric static signals from a human body and emitting control signals. The sensing controller 10 has a power switch 11, a plurality of batteries (not shown), a plurality of LED lights 12, and a transparent cover 16. The sensing controller 10 is connected to a buzzer 13, metal signal sensing wires 14 for extension and a trip control wire 140. Each signal sensing wire 14 has a metal foil sheet 15. One surface of the metal foil sheet 15 is coated with glue so that the metal foil sheets 15 and the signal sensing wires 14 can be adhered to the two sides of the protecting cover 3. The signal sensing wires 14 and the metal foil sheets 15 have a function of sensing and transmitting electric static signals of human body to the sensing controller 10.

In assembly of the present invention, it is only necessary to drill holes on the protecting cover 3 for locking the sensing controller 10, or adhere the sensing controller 10 to the protecting cover 3 by gluing without drilling any holes. Then the buzzer 13 is positioned, and metal foil sheets 15 and signal sensing wires 14 are adhered to the two lateral sides of the protecting cover 3. Finally, the trip control wire 140 is connected to the power control of the saw.

In application of the present invention, the power switch 11 is conducted, where one LED lights up, it shown that the detection state is actuated. At the same time, the signal sensing wires 14 and metal foil sheets 15 have the function of sensing electric static signals of human body. When a hand is inserted into the metal signal sensing wires 14 in the sensing range of the metal foil sheets 15, initially, all LEDs light up and flash so as to alert not to insert further. If the hand closes the saw further, not only all LEDs light up, but also the buzzer 13 buzzes and the motor of the saw is stopped so as not to hurt the hand.

In detail, since the signal sensing wires 14 and metal foil sheets 15 can transfer electric static signals of human body, when the hand inserts into the sensing range, initially, the electric static signals from the metal foil sheets 15 and signal sensing wires 14 are weak. This area of weak sening is called as an alarm area a. At this time, the sensing controller 10 senses a weak sensing signal to light up LEDs 12 only. The buzzer 13 will not buzz and the motor rotates continuously. When the hand moves closer, the electric static signals of human body becomes stronger. Then the hand is in a "trip area b". Thus, the sensing controller 10 senses a strong signals so that the LEDs 12 flashes, the buzzer 13 buzzes and the motor rotates.

Effect of the present invention will be describe herein.

The whole structure is integrally formed with the protecting cover 3. The level of the structure is raised or descended synchronously with the protecting cover 3.

The sensing controller 10 can receive electric static signals of human body. With the signal sensing wires 14, the effective area of the metal foil sheets 15 is enlarged. Thereby a front end of the protecting cover 3 has a larger sensing area which is like a wireless electric wave protecting cover.

There are storing and weak signals depending on the closeness of the band to the saw so that an alarm area and a trip area can be classified. Thereby the operation of the saw is based on the strength of the signals. In weak signals, the saw will not stop so as to avoid the trouble of the undesired stop.

The manmade electric static signals are used as a sensing medium so as to avoid the mistake of undesired stop.

Figure 5:
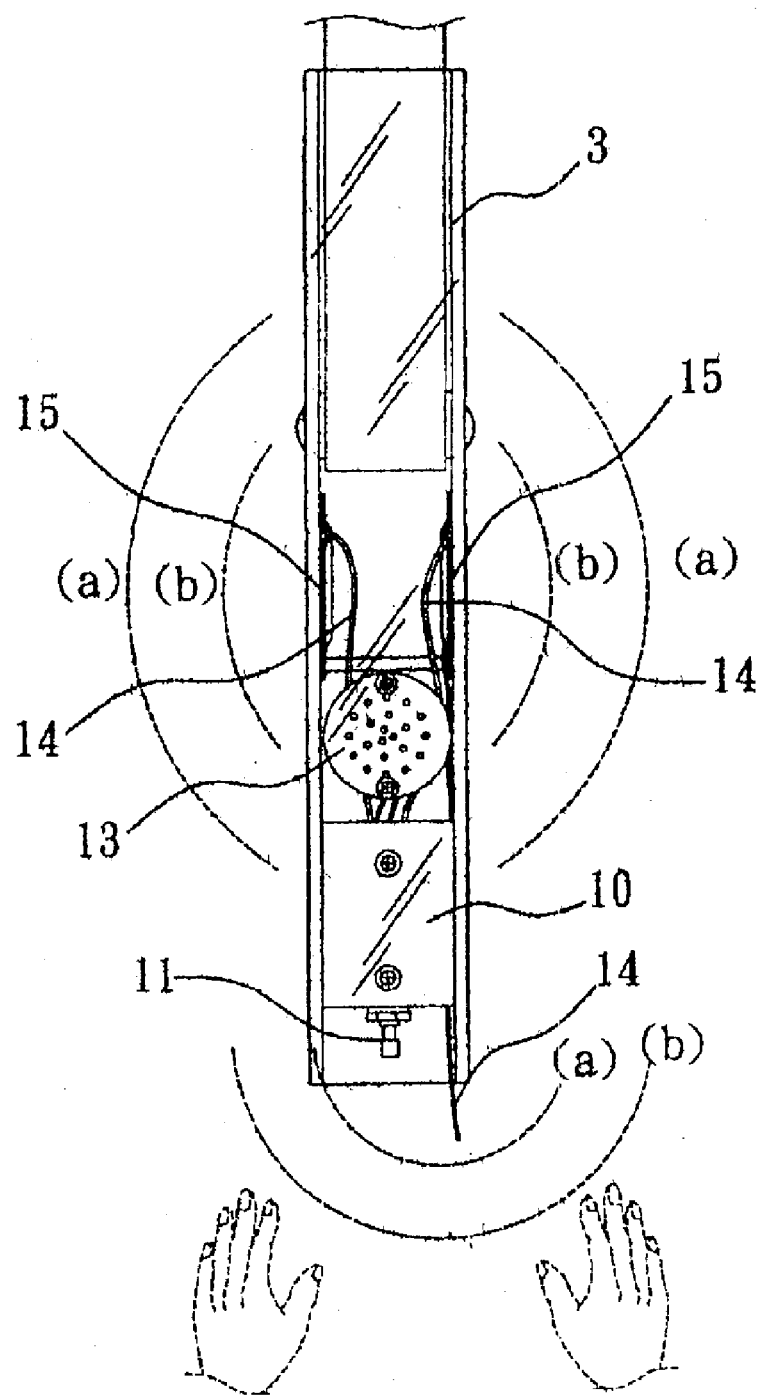
FIG. 5 is an elevational plane view of the present invention.

The lengths of the signal sensing wires are adjustable and they can protrude out of the metal foil sheets 15 and protecting cover 3. The signal sensing wires 14 can be adjusted to be in front of the protecting cover 3, as shown in FIG. 5. Thereby the orientation is adjusted.

The sensing controller 10 can be installed to a desired position of the machine table 1 and the protecting cover 3. It is only to use longer signal sensing wires 14 to extend to the protecting cover 3. The protecting cover 3 can be opaque rubber cover. All these are within the scope of the present invention.

The present invention is thus described, it will be obvious that the same may be varied in many ways. Such variations are not to be regarded as a departure from the spirit and scope of the present invention, and all such modification as would be obvious to one skilled in the art are intended to be included within the scope of the following claims.

What is claimed is:

1. A saw cover safety sensing device comprising:

a protecting cover;

a sensing controller at one side of the protecting cover;

a control circuit within the sensing controller; the control circuit serving for receiving electric static signals from a human body and emitting control signals; the sensing controller further comprising a power switch, at least one batteries, a plurality of LED) lights and a transparent cover;

at least one signal sensing wire connected to the sensing controller; each signal sensing wire having a metal foil sheet; one surface of the metal foil sheet being coated with glue so that the metal foil sheets and the signal sensing wires are adhered to two sides of the protecting cover; the signal sensing wires and the metal foil sheets having a function of transmitting electric static signals of human body to the sensing controller; the at least one signal sensing wire and at least one metal foil sheets having function of expanding sensing area so as to detect electric static signals emitted from a human body; and a buzzer connected to the sensing controller; the buzzer buzzes in response to electric static signals.

2. The saw cover safety sensing device as claimed in claim 1, further comprising a trip control wire connected to the sensing controller for tripping the operation of a saw within the saw cover in response to a strong electric static signals from a human body.

* * * * *